(12) United States Patent
Huang et al.

(10) Patent No.: US 8,014,049 B2
(45) Date of Patent: Sep. 6, 2011

(54) METHOD FOR AUTOMATIC COLOR CORRECTION AND APPARATUS THEREOF

(75) Inventors: Ming-Yu Huang, Taoyuan County (TW); Wen-Tsan Lo, Taipei County (TW)

(73) Assignee: Novatek Microelectronics Corp., Hsinchu (TW)

( * ) Notice: Subject to any disclaimer, the term of this patent is extended or adjusted under 35 U.S.C. 154(b) by 589 days.

(21) Appl. No.: 11/530,908

(22) Filed: Sep. 12, 2006

(65) Prior Publication Data

US 2008/0007805 A1    Jan. 10, 2008

(30) Foreign Application Priority Data

Jul. 4, 2006    (TW) .............................. 95124291 A (51) Int. Cl.
*G03F 3/08* (2006.01)
*H04N 1/40* (2006.01)
*G06K 9/00* (2006.01)
*G06K 9/68* (2006.01)

(52) U.S. Cl. ......... 358/518; 358/448; 382/167; 382/218

(58) Field of Classification Search .................. 358/518, 358/1.9, 530, 448, 461; 382/167, 169, 172, 382/168, 218, 220, 237, 261, 270, 307, 310
See application file for complete search history.

(56) References Cited

U.S. PATENT DOCUMENTS 4,403,253 A * 9/1983 Morris et al. ................. 348/572
5,874,988 A * 2/1999 Gu .................................. 348/97

OTHER PUBLICATIONS

Allegria et al. Precision of ADC Gain and Offset Error Estimation with Standard Histogram Test. IMCT 2005 Technical Conference;ay 17, 2005 Ottawa, Canada.*

* cited by examiner

*Primary Examiner* — Benny Q Tieu
*Assistant Examiner* — Ngon Nguyen
(74) *Attorney, Agent, or Firm* — Jianq Chyun IP Office (57) ABSTRACT

An apparatus for automatic color correction is provided, which includes an analog-to-digital converter (ADC), a plurality of section adders and a micro control unit (MCU). The section adders divide a test image signal through the ADC into sections and count the gray-level amount in each section. The MCU adjusts the offset and the gain of the ADC for automatic color correction, thereby ensuring that the color in the image signal almost appear to our eye as the true color.

16 Claims, 4 Drawing Sheets

METHOD FOR AUTOMATIC COLOR CORRECTION AND APPARATUS THEREOF

CROSS-REFERENCE TO RELATED APPLICATION

This application claims the priority benefit of Taiwan application serial no. 95124291, filed on Jul. 4, 2006. All disclosure of the Taiwan application is incorporated herein by reference.

BACKGROUND OF THE INVENTION

1. Field of Invention

The present invention relates to an automatic color correction, and more particularly, to a method for automatic color correction and apparatus thereof, wherein a test image signal is divided into a plurality of sections, so as to count the gray-level amount of each section, and thereby adjusting the offset and the gain of an analog-to-digital converter (ADC) accordingly.

2. Description of Related Art

Conventionally, the automatic color correction of an analog image signal takes the absolute maximum and minimum values of the signal as the level of the blackest and whitest respectively. However, in a common environment, the inductance of the signal line causes the oscillation of signals transmitted thereon. At this time, the blackest level and the whitest level are easily misjudged, such that the frame after the automatic color correction is not black enough or white enough.

SUMMARY OF THE INVENTION

An objective of the present invention is to provide a method for automatic color correction and an apparatus thereof, which is used to automatically correct the offset and gain of an analog-to-digital converter (ADC), so as to ensure that the color in the image signal almost appears to our eye as the true color.

Based on the above and other objectives, the present invention provides a method for automatic color correction. The method uses an ADC to receive an analog image signal, and adjusts the offset and/or gain of the ADC to correct the color of the analog image signal and then outputs a digital image signal. The method for automatic color correction comprises the following steps. A test image signal is received, which comprises a plurality of pixels with the blackest level. Next, the first gray-level range and the offset of the ADC are initialized, and the first gray-level range is divided into a plurality of subsections of the first section, wherein the first gray-level range starts from a gray-level value corresponding to the blackest level, the range of the first subsection of the first section (the first one of the subsections of the first section) starts from the above gray-level value corresponding to the blackest level. And each subsection of the first section has a gray-level amount to count the number of pixels falling therein. Then, the test image signal through the ADC is measured to obtain the gray-level amount for each subsection of the first section. Finally, whether the gray-level amount for the first subsection of the first section reaches a first threshold value or not is determined, and when the gray-level amount for the first subsection of the first section has not reached the first threshold value, the offset of the ADC is adjusted, the test image signal through the adjusted ADC is measured, and the above adjusting and measuring steps are repeated until the gray-level amount for the first subsection of the first section reaches the first threshold value.

If the received test image signal further comprises a plurality of pixels with the whitest level, the method for automatic color correction further comprises the following steps. The second gray-level range and gain of the ADC are initialized, and the second gray-level range is divided into a plurality of subsections of the second section, at least including a first subsection of the second section and a second subsection of the second section, wherein the second gray-level range ends at a gray-level value corresponding to the whitest level, and the range of the last subsection of the second section (i.e., the last one of the subsections of the second section) ends at the above gray-level value corresponding to the whitest level, and each subsection of the second section has a gray-level amount for counting the number of pixels falling therein. Next, the test image signal through the ADC is measured to obtain the gray-level amount for each subsection of the second section. Finally, whether the gray-level amount for the last subsection of the second section reaches a second threshold value or not is determined. When the gray-level amount for the last subsection of the second section has not reached the second threshold value, the gain of the ADC is adjusted, and then the test image signal through the adjusted ADC is measured, and the adjusting and the measuring steps are repeated until the gray-level amount for the last subsection of the second section reaches the second threshold value.

In an embodiment, before determining whether the gray-level amount for the first subsection of the first section reaches the first threshold value or not, it is determined first whether at least one of the gray-level amounts for the subsections of the first section is not zero. When the gray-level amounts for the subsections of the first section are all zero, the offset of the ADC is adjusted, and then the test image signal through the adjusted ADC is measured, and the adjusting and measuring steps are repeated until at least one of the gray-level amounts for the subsections of the first section is not zero. When at least one of the gray-level amounts for the subsections of the first section is not zero, the first gray-level range is reduced according to the distribution of the gray-level amounts for the subsections of the first section, so as to reduce the range of each subsection of the first section.

In an embodiment, before determining whether the gray-level amount for the last subsection of the second section reaches the second threshold value or not, it is determined first whether at least one of the gray-level amounts for the subsections of the second section is not zero. When the gray-level amounts for the subsections of the second section are all zero, the gain of the ADC is adjusted, and then the test image signal through the adjusted ADC is measured, and the adjusting and measuring steps are repeated until at least one of the gray-level amounts for the subsections of the second section is not zero. When at least one of the gray-level amounts for the subsections of the second section is not zero, the second gray-level range is reduced according to the distribution of the gray-level amounts for the subsections of the second section, so as to reduce the range of each subsection of the second section.

Based upon the above and other objectives, the present invention further provides an apparatus for automatic color correction, which comprises an ADC, a plurality of section adders and a micro control unit (MCU), wherein the section adders are coupled to the ADC, and the MCU is coupled between the section adders and the ADC. The ADC is used to receive an analog image signal, adjust the offset of the ADC according to an offset control signal and/or adjust the gain of the ADC according to a gain control signal, so as to correct the color of the analog image signal and output a digital image signal. The section adders are used to divide the gray-level range of the signal output by the ADC into a plurality of sections, and each subsection of the section has a gray-level amount for counting the number of pixels falling therein. The MCU is used to measure the gray-level amount of the test image signal through the ADC in each subsection of the section after the ADC has received the test image signal, and used to output an offset control signal and/or a gain control signal according to the distribution of the gray-level amounts for the subsections of the section, wherein the test image signal comprises a plurality of pixels with blackest level and/or whitest level.

The apparatus for automatic color correction and method thereof provided in the present invention may be used to correct an analog to digital converter (ADC) according to pixels having the blackest level or whitest level in the test image signal respectively. First, the correction is performed according to the pixel with the blackest level in the test image signal, and then, the correction is performed according to the pixel with the whitest level. Alternatively, the correction is performed first according to the pixel with the whitest level in the test image signal, and then, the correction is performed according to the pixel with the blackest level. Only the corresponding steps are required to be adjusted, which can be easily appreciated by those ordinarily skilled in the art, and thus will not be described herein any more.

A plurality of section adders are used in the present invention to divide the test image signal through the ADC into a plurality of subsections of the section to count the gray-level amount for each subsection of the section, and the offset and gain of the ADC are adjusted accordingly, so as to achieve the objective of automatic color correction, and thereby ensuring that the color in the image signal almost appears to our eye as the true color.

In order to make the aforementioned and other objects, features and advantages of the present invention comprehensible, a preferred embodiment accompanied with figures is described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
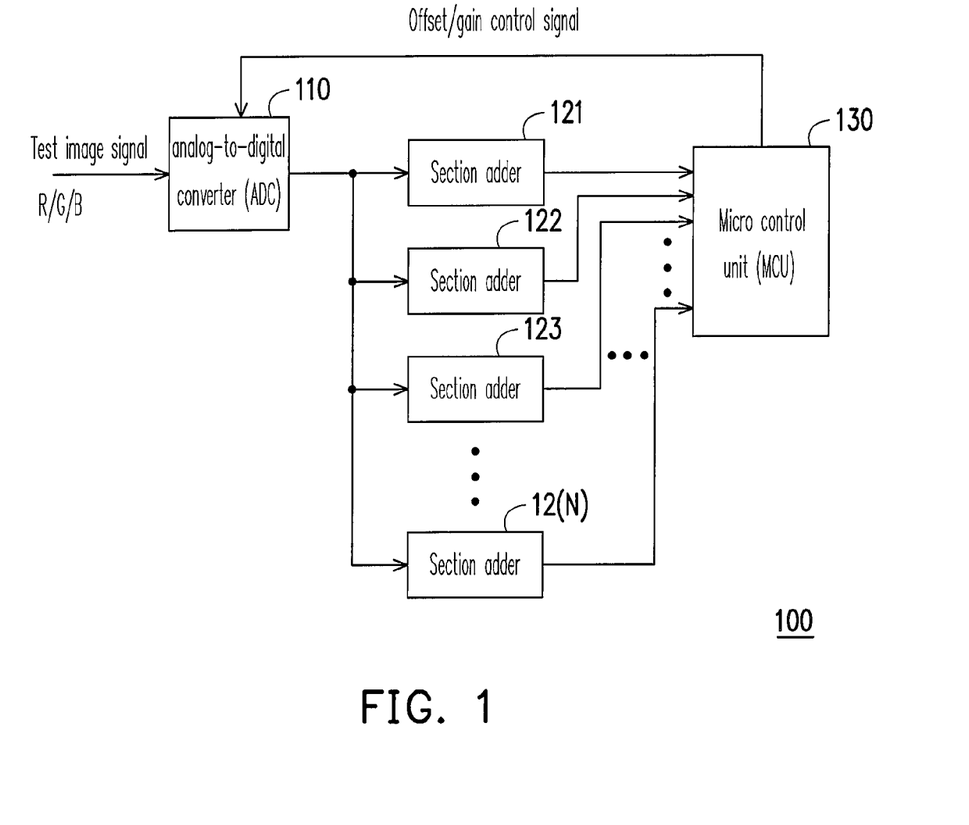
FIG. 1 is a circuit block diagram of an apparatus for automatic color correction according to an embodiment of the present invention.

FIG. 1 is a circuit block diagram of an apparatus for automatic color correction according to an embodiment of the present invention. Referring to FIG. 1, the apparatus for automatic color correction 100 comprises an analog-to-digital converter (ADC) 110, a plurality of section adders 121-12(N) and a micro control unit (MCU) 130, wherein the section adders 121-12(N) are coupled to the ADC 110, and the MCU 130 is coupled between the section adders 121-12(N) and the ADC 110. The ADC 110 is used to convert an analog image signal into a digital image signal. Generally, the level of the analog image signal is 0-0.7 V from the blackest to the whitest, and the gray-level value of the 8-bit digital image signal is 0-255 from the blackest to the whitest. In other words, the gray-level value corresponding to the blackest level 0 V is 0, and the gray-level value corresponding to the whitest level 0.7 V is 255, which is taken as an example herein below.

In order to solve the problem of the conventional art that the digital image signal output by the ADC after automatic color correction is neither black enough nor white enough. In the present invention, after the ADC 110 has received the test image signal (an analog image signal), the section adders 121-12(N) are used to divide the gray-level range of the test image signal through the ADC 110 into a plurality of sections, which may be a plurality of subsections of the section in this embodiment. Then, the MCU 130 measures and counts the gray-level amount of the test image signal falling in each subsection of the section, and outputs an offset control signal and/or a gain control signal according to the distribution of the gray-level amounts for the subsections of the section, so as to adjust the offset and/or gain of the ADC 110, thereby ensuring the color in the image signal almost appears to our eye as the true color. The test image signal comprises a plurality of pixels with the blackest level and/or whitest level, wherein the gray-level amount is the number of pixels falling in each subsection of the section.

Figure 2:
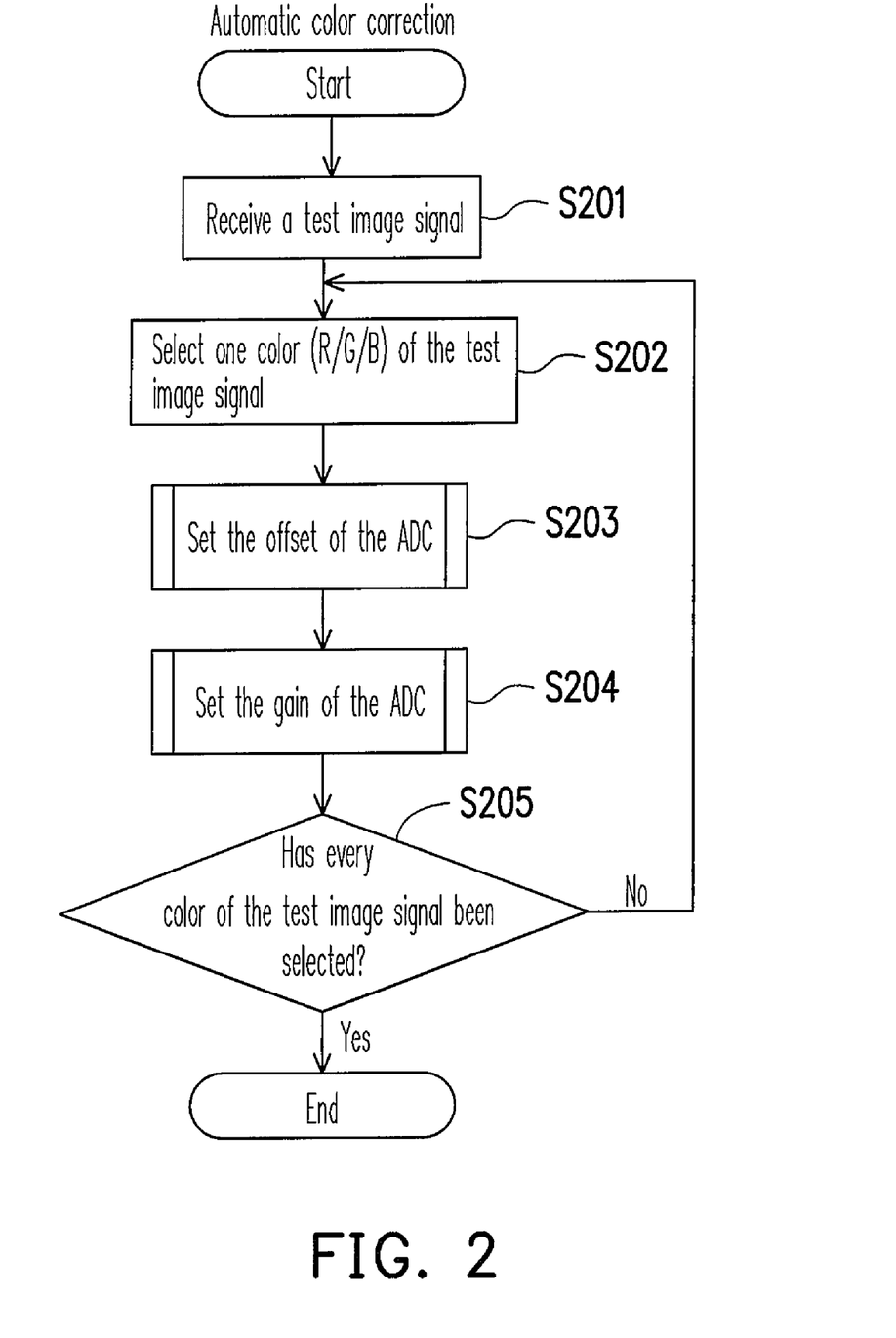
FIG. 2 is a flow chart of a method for automatic color correction according to an embodiment of the present invention.

FIG. 2 is a flow chart of a method for automatic color correction applicable in the apparatus for automatic color correction 100 as shown in FIG. 1 according to an embodiment of the present invention. In order to facilitate the illustration of the embodiment, a color signal is taken as an example of the test image signal herein below, and the color of the color signal is represented by a red-green-blue color space, that is, the color is represented by a combination of three bases, namely, red, green and blue. Further, a pixel only comprising the blackest level and a pixel only comprising whitest level are taken as examples of the pattern of the test image signal.

Referring to FIG. 2, as for the method for automatic color correction, a test image signal is received by the ADC 110 in step S201. The test image signal comprises pixels of three colors, i.e., red, green and blue, and the pixel of each color also comprises the pixel with the blackest level and the pixel with the whitest level, therefore, in step S202, any one of the three colors (e.g., red) is selected to perform the color correction first. Then, the correction is performed to the color selected in step S202: the offset of the ADC 110 is set in step S203 and the gain of the ADC 110 is set in step S204. Finally, in step S205, whether the corrections for the three colors are completed or not is determined, and if not, the method returns to step S202 to select the remained color without having been corrected yet; if yes, the color correction is finished. In another embodiment of the present invention, the order of the step S203 and the step S204 may be exchanged, that is to say, the gain of the ADC 110 may be set first, and then, the offset of the ADC 110 is set.

Figure 3:
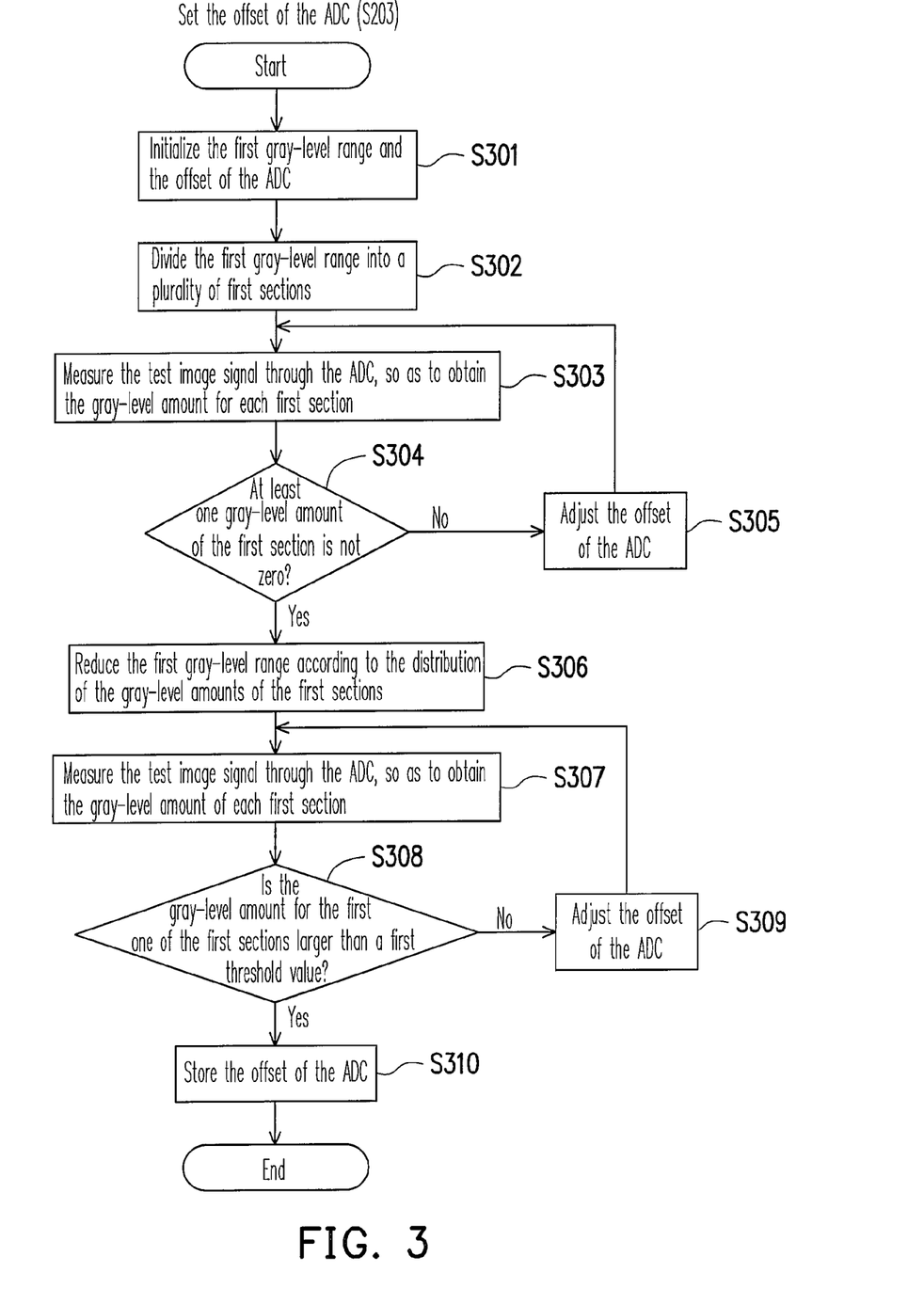
FIG. 3 is a detailed flow chart of step S203 (setting the offset of the ADC) in FIG. 2.

FIG. 3 is a detailed flow chart of the step S203 in FIG. 2, wherein the offset of the ADC 110 is set according to the distribution status of the pixel with the blackest level in the test image signal in the section adders 121-12(N). Referring to FIG. 3, first, in step S301, the first gray-level range and the offset of the ADC 110 are initialized. As the gray-level value corresponding to the blackest level is 0, the first gray-level range of the signal output by the ADC 110 starts from the gray-level value 0 and ends at another gray-level value X, wherein 0<X≦255, and X is an integer. The X is generally set to be 255 at the very beginning. After several corrections, it is determined that the signal oscillation causes the offset of the blackest level, and the X may be set to be smaller than 255, so as to accelerate the correction speed. Generally, [A, B] is used to represent a range, and the range starts from the numeral A and ends at the numeral B, therefore, the above first gray-level range is represented as [0, X].

In step S302, the section adders 121-12(N) are used to divide the first gray-level range [0, X] into N subsections of the first section. In this embodiment, for example, X is 79 and N is 8 and each of the section adders 121-128 divides the first gray-level range [0, 79] averagely. Therefore, the section adder 121 is responsible for counting the gray-level amount for the first subsection [0, 9] of the first section, the section adder 122 is responsible for counting the gray-level amount for the second subsection [10, 19] of the first section, . . . , and the section adder 128 is responsible for counting the gray-level amount for the last subsection [70, 79] of the first section (i.e., the eighth subsection of the first section), wherein the range of the first subsection [0, 9] of the first section must start from the gray-level value 0. In another embodiment of the present invention, the first subsection of the first section represents the first one of the subsections of the first section, the second subsection of the first section represents the second one of the subsections of the first section, and so forth, which will not be described herein any more.

In step S303, the test image signal through the ADC 110 (i.e., the signal output by the ADC 110) is measured, so as to obtain the gray-level amount for each subsection of the first section. In step S304, whether at least one of the gray-level amounts for the subsections of the first section is not zero is determined. When the gray-level amounts for the subsections of the first section are all zero, it indicates that the offset of the blackest level caused by signal oscillation has exceeded the original initialized first gray-level range [0, 79], and it is required to adjust the offset of the ADC 110 in step S305, so as to draw the offset of the blackest level into the first gray-level range [0, 79]. Then, the method returns to step S303 to measure the signal output by the adjusted ADC 110, and the adjusting and measuring steps in steps S303-S305 are repeated until at least one of the gray-level amounts for the subsections of the first section is not zero.

When at least one of the gray-level amounts for the subsections of the first section is not zero, it indicates that the offset of the blackest level caused by signal oscillation falls in the first gray-level range [0, 79], therefore, the first gray-level range may be reduced according to the distribution of the gray-level amounts for the subsections of the first section in step S306, for example, the initialized first gray-level range [0, 79] is reduced to be [0, 39]. As such, the range of each subsection of the first section divided by the section adders 121-128 is also reduced, for example, the first subsection [0, 9] of the first section is reduced to be [0, 4].

After the first gray-level range has been reduced, in step S307, the signal output through the ADC 110 is measured, so as to obtain the gray-level amount for each subsection of the first section. In step S308, whether the gray-level amount for the first subsection of the first section is larger than the first threshold value or not is determined. That is because the signal oscillation may cause that the gray-level amounts for several subsections of the first section are not zero. However, among the subsections of the first section having gray-level amounts not being zero, the one with the largest gray-level amount represents the blackest subsection currently. Therefore, the first threshold value is used as an identification value, and once it is determined in step S308 that, the gray-level amount for the first subsection of the first section is larger than the first threshold value, it indicates that the currently blackest level falls in the first subsection of the first section, therefore, the offset of the ADC 110 at this time is stored in step S310. Or otherwise, the adjusting and measuring steps in steps S307-S309 are repeated until the gray-level amount for the first subsection of the first section is larger than the first threshold value. Obviously, reducing the first gray-level range in step S306 aims at making the offset of the ADC 110 more precise after the color correction.

In another embodiment of the present invention, the distribution status of pixels with the whitest level in the section adders 121-12(N) may also be used to set the offset of the ADC 110. The gray-level value corresponding to the whitest level is 255, such that the first gray-level range of the signal output by the ADC 110 starts from the gray-level value X and ends at another gray-level value of 255, wherein 0<X≦255, and X is a positive integer. Through the disclosure of the present invention, the implementation details of using the pixels with the whitest level to correct the offset of the ADC 110 is easily appreciated by those ordinarily skilled in the art, which thus will not be described herein any more.

Figure 4:
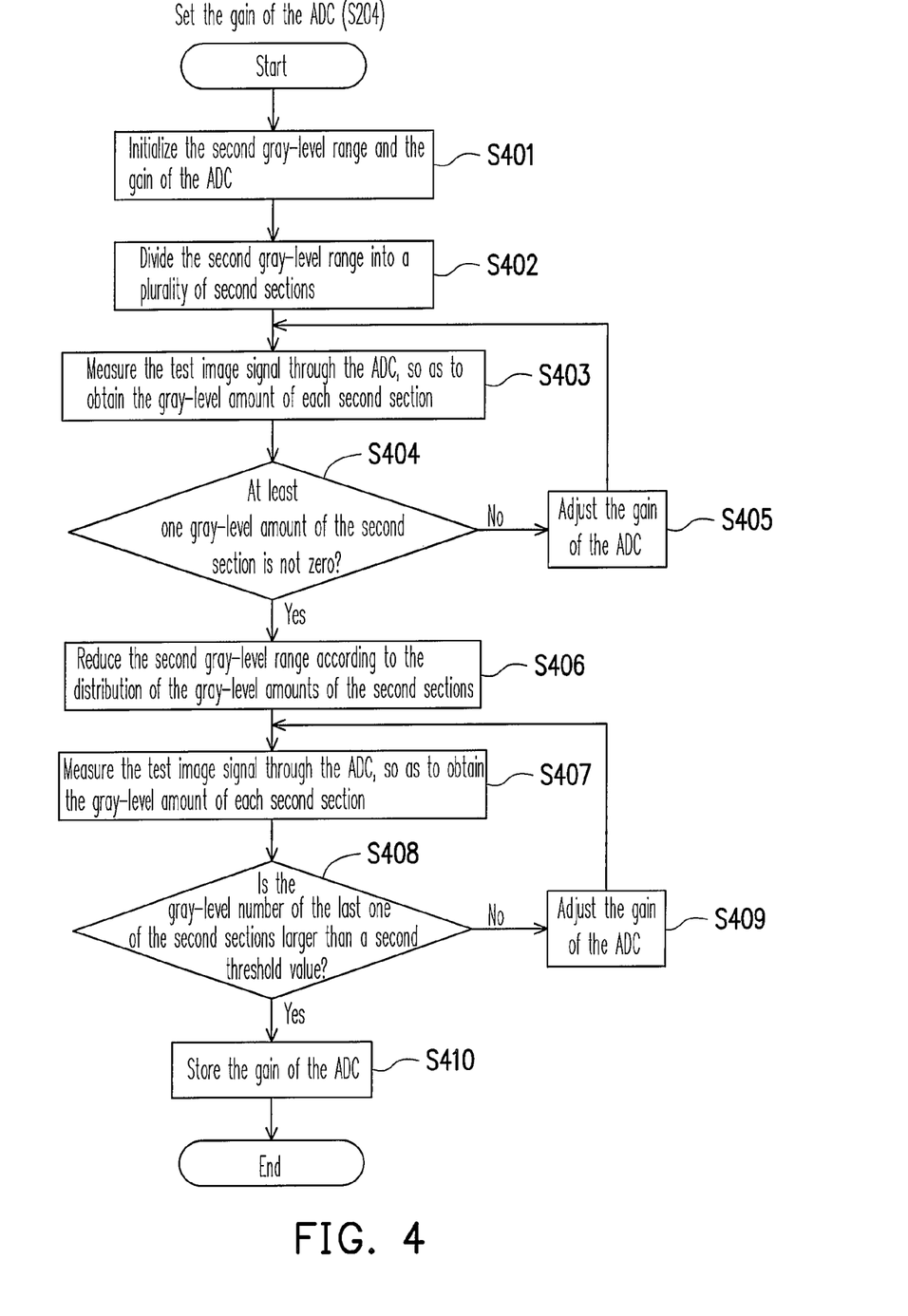
FIG. 4 is a detailed flow chart of step S204 (setting the gain of the ADC) in FIG. 2.

FIG. 4 is a detailed flow chart of the step S204 in FIG. 2, wherein the gain of the ADC 110 is set according to the distribution status of the pixel with the whitest level in test image signal in the section adders 121-12(N). Generally, before adjusting the gain of the ADC 110, the correct offset of the ADC 110 is first obtained in step S203. Referring to FIG. 4, in step S401, the second gray-level range and the gain of the ADC 110 are initialized first. The gray-level value corresponding to the whitest level is 255, such that the second gray-level range of the signal output by the ADC 110 starts from the gray-level value Y and ends at the gray-level value of 255 (i.e., [Y, 255]), wherein 0≦Y<255 and Y is an integer. Generally, the above Y is set to be 0 at the very beginning. After several corrections, it is determined that the signal oscillation causes the offset of the whitest level, and the Y may be set as larger than 0, so as to accelerate the correction speed.

In step S402, the section adders 121-12(N) are used to divide the second gray-level range [Y, 255] into N subsections of the second section. In this embodiment, for example, Y is 176 and N is 8, and each of the section adders 121-128 divides the second gray-level range [176, 255] averagely. Therefore, the section adder 121 is responsible for counting the gray-level amount for the first subsection [176, 185] of the second section, the section adder 122 is responsible for counting the gray-level amount for the second subsection [186, 195] of the second section, . . . , and the section adder 128 is responsible for counting the gray-level amount for the last subsection [246, 255] of the second section (i.e., the eighth subsection of the second section), wherein the range of the last subsection [246, 255] of the second section must end at the gray-level value of 255.

In step S403, the test image signal through the ADC 110 (i.e., the signal output by the ADC 110) is measured, so as to obtain the gray-level amount for each subsection of the second section. In step S404, whether at least one of the gray-level amounts for the subsections of the second section is not zero is determined. When the gray-level amounts for the subsections of the second section are all zero, it indicates that the offset of the whitest level caused by signal oscillation has exceeded the original initialized second gray-level range [176, 255], and it is required to adjust the gain of the ADC 110 in step S405, so as to draw the offset of the whitest level into the second gray-level range [176, 255]. Then, the method returns to step S403 to measure the signal output by the adjusted ADC 110, and the adjusting of measuring steps in steps S403-S405 are repeated until at least one of the gray-level amounts for the subsections of the second section is not zero.

When at least one of the gray-level amounts for the subsections of the second section is not zero, it indicates that the offset of the whitest level caused by signal oscillation falls in the second gray-level range [176, 255], therefore, the second gray-level range is reduced according to the distribution of the gray-level amounts for the subsections of the second section in step S406, and thereby the range of each subsection of the second section is also reduced.

After reducing the second gray-level range, in step S407, the signal output through the ADC 110 is measured, so as to obtain the gray-level amount for each subsection of the second section. In step S408, whether the gray-level amount for the last subsection of the second section is larger than the second threshold value or not is determined. That is because the signal oscillation causes that the gray-level amounts for several subsections of the second section are not zero. However, among the subsections of the second section with gray-level amounts not being zero, the one with the largest gray-level amount represents that the current subsection of the second section where whitest falls therein due to offset. Therefore, once it is determined in step S408 that the gray-level amount for the last subsection of the second section is larger than the second threshold value, it indicates that the currently whitest level falls in the last subsection of the second section, therefore, the gain of the ADC 110 at this time is stored in step S410. Or otherwise, the adjusting and measuring steps in steps S407-S409 are repeated until the gray-level amount for the last subsection of the second section is larger than the second threshold value. Obviously, reducing the second gray-level range in step S406 aims at making the gain of the ADC 110 obtained after the color correction being more precise.

In another embodiment of the present invention, the distribution status of pixels with the blackest level in the section adders 121-12(N) may also be used to set the gain of the ADC 110. The gray-level value corresponding to the blackest level is 0, thus, the second gray-level range of the signal output by the ADC 110 starts from the gray-level value of 0 and ends at the gray-level value Y (i.e., [0, Y]), wherein 0≦Y<255, and Y is an integer. In other words, as long as the offset of the whitest level and that of the blackest level of the ADC 110 are tested, the ADC 110 can be corrected, and the testing order may be adjusted according to design requirements. Through the disclosure of the present invention, those ordinarily skilled in the art may easily appreciate implementation details of different testing orders, which thus will not be described herein any more.

To sum up, in the present invention, a plurality of section adders are used to divide the test image signal through the ADC into a plurality of sections, so as to count the gray-level amount of each section, and adjust the offset and the gain of the ADC accordingly, thereby achieving the purpose of automatic color correction, and ensuring that the color in the image signal almost appears to our eye as the true color.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for automatic color correction, using an analog-to-digital converter (ADC) to receive an analog image signal, adjusting an offset and/or gain of the ADC, so as to correct the color of the analog image signal and output a digital image signal, the method for automatic color correction comprising:

receiving a test image signal, wherein the test image signal comprises a pixel with a first color level;

initializing a first gray-level range and the offset of the ADC, wherein the first gray-level range starts from a gray-level value corresponding to the first color level;

dividing the first gray-level range into a plurality of subsections of a first section by a plurality of section adders, at least including a first subsection of the first section and a second subsection of the first section, wherein the range of the first subsection of the first section starts from the gray-level value corresponding to the blackest level, each subsection of the first section has a gray-level amount, and the gray-level amount is the number of pixels having gray-level values falling within the subsection of the first section;

measuring the test image signal through the ADC, so as to obtain the gray-level amount for each of the subsections of the first section;

reducing the first gray-level range according to the distribution of the gray-level amounts for the subsections of the first section, so as to reduce the range of each of the subsections of the first section, the total range of the subsections of the first section received by the section adders being reduced;

determining whether the gray-level amount for the first subsection of the first section reaches a first threshold value or not and adjusting the offset of the ADC only according to the gray-level amount for the first subsection of the first section after reducing the first gray-level range; and when the gray-level amount for the first subsection of the first section has not reached the first threshold value, adjusting the offset of the ADC and measuring the test image signal through the adjusted ADC, and repeating the adjusting and measuring steps until the gray-level amount for the first subsection of the first section reaches the first threshold value.

2. The method for automatic color correction as claimed in claim 1, wherein before reducing the first gray-level range according to the distribution of the gray-level amounts for the subsections of the first section, it further comprises:

determining whether at least one of the gray-level amounts for the subsections of the first section is not zero; and when the gray-level amounts for the subsections of the first section are all zero, adjusting the offset of the ADC, measuring the test image signal through the adjusted ADC, and repeating the adjusting and measuring steps until at least one of the gray-level amounts for the subsections of the first section is not zero.

3. The method for automatic color correction as claimed in claim 2, wherein the step of reducing the first gray-level range according to the distribution of the gray-level amounts for the subsections of the first section further comprises:

when at least one of the gray-level amounts for the subsections of the first section is not zero, reducing the first gray-level range according to the distribution of the gray-level amounts for the subsections of the first section; so as to reduce the range of each of the subsections of the first section.

4. The method for automatic color correction as claimed in claim 1, wherein the test image signal further comprises a pixel with a second color level.

5. The method for automatic color correction as claimed in claim 4; further comprising:
- initializing a second gray-level range and the gain of the ADC, wherein the second gray-level range ends at a gray-level value corresponding to the second color level;
- dividing the second gray-level range into a plurality of subsections of the second section, at least including a first subsection of the second section and a second subsection of the second section, wherein the range of the last subsection of the second section ends at the gray-level value corresponding to the second color level, each of the subsections of the second section has a gray-level amount, and the gray-level amount is the number of pixels with gray-level values falling in subsections of the second section;
- measuring the test image signal through the ADC, so as to obtain the gray-level amount for each of the subsections of the second section;
- determining whether the gray-level amount for the last subsection of the second section reaches a second threshold value; and
- when the gray-level amount for the last subsection of the second section has not reached the second threshold value, adjusting the gain of the ADC, measuring the test image signal through the adjusted ADC, and repeating the adjusting and measuring steps until the gray-level amount for the last subsection of the second section reaches the second threshold value.

6. The method for automatic color correction as claimed in claim 5, wherein before determining whether the gray-level amount for the last subsection of the second section reaches the second threshold value, it further comprises:
- determining whether at least one of the gray-level amounts for the subsections of the second section is not zero; and
- when the gray-level amounts for the subsections of the second section are all zero, adjusting the gain of the ADC, measuring the test image signal through the adjusted ADC, and repeating the adjusting and measuring steps until at least one of the gray-level amounts for the subsections of the second section is not zero.

7. The method for automatic color correction as claimed in claim 6, wherein before determining whether the gray-level amount for the last subsection of the second section reaches the second threshold value, it further comprises:
- when at least one of the gray-level amounts for the subsections of the second section is not zero, reducing the second gray-level range according to the distribution of the gray-level amounts for the subsections of the second section, so as to reduce the range of each of the subsections of the second section.

8. The method for automatic color correction as claimed in claim 5, wherein the first color level comprises the blackest level, and a pixel with the first color level belongs to a base of a color space for the test image signal; the second color level comprises the whitest level, and a pixel with the second color level belongs to a base of a color space for the test image signal.

9. The method for automatic color correction as claimed in claim 8, wherein the color space is a red-green-blue color space, and the base of the red-green-blue color space comprises colors of red, green and blue.

10. The method for automatic color correction as claimed in claim wherein the first color level comprises the whitest level, and a pixel with the first color level belongs to a base of a color space for the test image signal; the second color level comprises the blackest level, and a pixel with the second color level belongs to a base of a color space for the test image signal.

11. The method for automatic color correction as claimed in claim 10, wherein the color space is a red-green-blue color space, and the base for the red-green-blue color space comprises colors of red, green and blue.

12. An apparatus for automatic color correction, comprising:
- an analog-to-digital converter (ADC), for receiving an analog image signal, and adjusting an offset of the ADC according to an offset control signal and/or adjusting a gain of the ADC according to a gain control signal, so as to correct the color of the analog image signal and output a digital image signal;
- a plurality of section adders, coupled to the ADC, for dividing a gray-level range of a signal output by the ADC into a plurality of sections, wherein each of the sections has a gray-level amount, and the gray-level amount is the number of pixels with gray-level values falling in the section; and
- a micro control unit (MCU), coupled between the section adders and the ADC, for measuring the gray-level amount of the test image signal through the ADC in each of the sections after the ADC has received a test image signal, and outputting the offset control signal and/or the gain control signal according to the distribution of gray-level amounts for the sections, wherein the test image signal comprises a plurality of pixels with the blackest and/or whitest level,
- wherein when the ADC receives the test image signal and the test image signal comprises a pixel with the blackest level, the gray-level range being divided into the sections by the section adders starts from a gray-level value corresponding to the blackest level and being reduced according to the distribution of the gray-level amounts for the subsections of the first section, so as to reduce the range of each of the subsections of the first section, the total range of the subsections of the first section received by the section adders is reduced, and the MCU outputs the offset control signal according to the distribution of gray-level amounts for the sections, and when the gray-level amount for a first section in the sections has not reached a first threshold value, the MCU outputs the offset control signal to adjust the offset of the ADC, measures the test image signal through the adjusted ADC, and repeats the adjusting and measuring steps until the gray-level amount for the first section in the sections reaches the first threshold value, and the range of the first section in the sections starts from the gray-level value corresponding to the blackest level.

13. The apparatus for automatic color correction as claimed in claim 12, wherein when the ADC receives the test image signal and the test image signal comprises a pixel with the whitest level, the gray-level range divided into the sections by the section adders starts from a gray-level value corresponding to the whitest level, and the MCU outputs the gain control signal according to the distribution of gray-level amounts for the sections.

14. The apparatus for automatic color correction as claimed in claim 13, wherein when the gray-level amount for the last section in the sections has not reached a second threshold value, the MCU outputs the gain control signal to adjust the gain of the ADC, measures the test image signal through the adjusted ADC, and repeats the adjusting and measuring steps until the gray-level amount for the last section in the sections reaches the second threshold value, and the range of the last section in the sections ends at the gray-level value corresponding to the whitest level.

15. The apparatus for automatic color correction as claimed in claim 12, wherein the pixel belongs to a base of a color space for the test image signal.

16. The apparatus for automatic color correction as claimed in claim 15, wherein the color space is a red-green-blue color space, and the base of the red-green-blue color space comprises colors of red, green and blue.

* * * * *